3,794,573
METHOD FOR THE PRODUCTION OF
L-ASCORBIC ACID
Hideo Matsumaru, Ashiya, and Nobuyoshi Hayashi, Suita, Japan, assignors to Takeda Chemical Industries, Ltd., Osaka, Japan
No Drawing. Filed May 27, 1971, Ser. No. 147,659
Claims priority, application Japan, June 16, 1970, 45/52,011
Int. Cl. B01j 1/10; C07d 5/12
U.S. Cl. 204—159
10 Claims

ABSTRACT OF THE DISCLOSURE

Process for producing L-ascorbic acid (vitamin C) by irradiating electromagnetic waves, particularly $\gamma$-ray, to a solution containing L-sorbose and/or L-tagatose.

The present invention relates to a process for producing L-ascorbic acid (vitamin C).

A commercial process for the production of vitamin C, is generally known as follows; D-sorbitol obtained by the catalytic reduction of D-glucose is oxidized with microorganisms to give L-sorbose. The L-sorbose is converted by acetone into diacetone-L-sorbose. The diacetone-L-sorbose is oxidized, esterified and simultaneously deacetonated to give methyl L-gulonate. The methyl L-gulonate is converted into its corresponding lactone and enolized to give L-ascorbic acid. This commercial process is complicated and troublesome. Further, B. Coleby discloses a process for producing ascorbic acid by irradiating X ray, gamma ray, $^{60}$Co or cathode ray to an aqueous solution of such $\gamma$-lactones as L-gulono-$\gamma$-lactone, L-galactono-$\gamma$-lactone, D-glucono-$\gamma$-lactone and D-gulono-$\gamma$-lactone (B. Coleby, Chemistry and Industry, Jan. 26, 1957, p. 111). In this process, the starting lactones are expensive. Further, the separation of L-ascorbic acid from the irradiated solution encounters great difficulties. Reaction yield, G value, thereof is as low as 0.16–0.94. Moreover, an aqueous solution of such hexoses as D-glucose, D-galactose and D-mannose is irradiated with electrons to obtain the corresponding uronic acids. (Nature, vol. 173, May 29, 1954, p. 1044.)

The present inventors have studied processes for obtaining L-ascorbic acid from L-sorbose or L-tagatose which can easily be prepared from D-glucose, and have completed the present invention.

An object of the present invention is to provide a simple process for the production of L-ascorbic acid in comparison with the conventional processes.

Another object of the present invention is to provide a process for obtaining L-ascorbic acid in one step from easily obtainable L-sorbose or L-tagatose.

According to the present invention, a solution of L-sorbose and/or L-tagatose is irradiated with electromagnetic waves.

SOLUTION OF L-SORBOSE AND/OR L-TAGATOSE

The usable solvent includes water, such lower alcohols as methanol, ethanol or the like, and hydrophilic solvents such as acetone, pyridine or the like. The mixtures of these solvents may also be used.

The concentrations of starting solution are, usually, from $1 \times 10^{-5}$ mol/l. to $1 \times 10^1$ mol/l, preferably, from $1 \times 10^{-1}$ mol/1 to $1 \times 10^{-2}$ mol/1.

Air may remain in the solution. However, it is preferred that the air is displaced by such an inert gas as helium, nitrogen, $N_2O$ or the like.

The pH of the solution is, preferably, from 8 to 13. Particularly the range from 10 to 12 is more preferable. To adjust the pH of the solution, such inorganic bases as alkali metal hydroxide, e.g. potassium hydroxide, sodium hydroxide or the like or organic bases such as pyridine, trimethylamine or the like may be added.

A reaction accelerator may be used. It includes such metallic compounds as ferrous sulfate, alumina, zinc oxide or the like. The metallic compound is incorporated in an amount of from 0.01 to 1 mole, preferably from 0.05 to 0.5 mole per mole of the L-sorbose or L-tagatose.

ELECTROMAGNETIC WAVES $\beta,\gamma$ (including X ray), and UV rays may be employed. Particularly, $\gamma$-ray is preferable.

IRRADIATION

The present reaction proceeds regardless of the irradiation temperature. However, the temperature is preferably 30° C. or less in order to prevent the decomposition of L-ascorbic acid formed. Particularly, the range within 20° C. to −10° C. is more preferable.

There is a possibility that L-ascorbic acid formed is decomposed by the peroxides by-produced during the reaction. Thus, it is preferred that metals such as Pt and Pd, or a reagent such as manganese dioxide or the like, which decomposes peroxides, is incorporated in the reaction mixture during or after the reaction. It is further desirable to stir the reaction system in order to prevent uneven distribution of the dose absorbed.

The formation of L-ascorbic acid during the reaction can be analyzed qualitatively and quantitatively with ease and speed. A part of the reaction mixture is taken as a sample, and evaluation is effected by means of the UV absorption spectra titration method by 2,6-dichlorophenol indophenol and various kinds of chromatography.

ISOLATION

The reaction mixture, for example, is bubbled with hydrogen sulfide and freeze-dried to obtain a dried residue. The residue may be extracted with acetone and, the extract purified by, for instance, thin layer chromatography. Alternatively, the reaction mixture may directly be fed to a tower packed with ion exchange resin, and then the elute containing the unaltered starting material is recycled for irradiation.

Examples of the present invention are as follows.

Example 1

L-sorbose (1.8 g.) was dissolved in 1 liter of distilled water. The solution was bubbled with helium for about 2 hours so as to replace the air in the solution. The thus obtained solution was irradiated with $\gamma$-ray ($3.6 \times 10^{20}$ ev./ml.) at room temperature (20° C.) The yield of the L-ascorbic acid in the reaction mixture was 7% when it was determined by the UV absorption at 265 m$\mu$ of L-ascorbic acid. After the irradiation, hydrogen sulfide was passed through the reaction mixture, and then the mixture was freeze-dried. The residue was further dried in a vacuum desiccator overnight. The thus dried residue was extracted with 100 ml. of acetone which had been distilled, bubbled with nitrogen to replace the dissolved air and then saturated with hydrogen sulfide. The acetone extract was concentrated under reduced pressure at a temperature from 25 to 30° C. The remaining substance was dissolved in a small amount of methanol. After the air in the solution was replaced by nitrogen, the solution was poured in a silica gel column chromatography, and then eluted with methanol. The fractions having a UV absorption band at 245 m$\mu$ were gathered, and the solvent was distilled out under reduced pressure at a temperature from 25 to 30° C. The residue was dissolved in a small amount of methanol. The thus obtained solution was charged on silica gel thin layer chromatography, and after drying, was developed with methanol. The portion of L- ascorbic acid on the thus developed thin layer chromatography was collected, and was extracted with methanol. The methanol extract was distilled under reduced pressure. The residue was recrystallized from a mixture of methanol and ethanol (2:1) to obtain 9.8 mg. of L-ascorbic acid crystals. Melting point 186–187° C. (alone or mixed with an authentic L-ascorbic acid). In the paper chromatography of the present product, the filter paper (Toyo Roshi No. 5B, sold by Toyo Roshi Kaisha, in Japan) impregnated with oxalic acid was dried in air and used. The developing was carried out using respectively the two solvents of n-butanol (60 ml.) saturated with water (40 ml.) and excess of oxalic acid, and phenol (50 g.) saturated with water (10 ml.) and excess of oxalic acid. In the case of the former solvent, $R_f$ was 0.36; in the case of the latter, $R_f$ 0.48. The two $R_f$ coincided with the $R_f$ value of the authentic L-ascorbic acid developed at the same time.

Ultraviolet absorption:

$$UV\ \lambda_{max.}^{MeOH}\ m\mu\ (\epsilon),\ 245\ (8.5 \times 10^3)$$

$$UV\ \lambda_{max.}^{H_2O}\ m\mu\ (\epsilon),\ 265\ (9.9 \times 10^3)$$

Gas liquid phase chromatography by means of Yanagimoto 550–FP (FID) (produced by Yanagimoto Manufacturing Co., Ltd. in Japan).

The authenic L-ascorbic acid (1.120 mg.) and the present product (1.020 mg.) were individually weighed in a micro tube, and 0.5 ml. of a trimethylsilylating agent was added thereto. The mixtures were allowed to stand overnight at room temperature, and were identified under the following three column conditions:

(1) Column [10% silicone DC QF-1 (Chromosorb W 80–100)] (sold by Nishio Kogyo K.K.) 1.8 m., 2.2 mm. $\phi$:
   Column temperature: 180° C.,
   Carrier gas: He, 2.1 kg./cm.$^2$, 7 ml./min.,
   Chart speed: 1 cm./min.
   Retention time: 14.2 min., which coincides with that of the authentic sample.

(2) Column [10% silicone OV-1 (Gas-chrom Q 80–100)] (sold by Nishio Kogyo K.K.) 1.8 m., 2.2 mm. $\phi$:
   Column temperature: 180° C.,
   Carrier gas: He, 0.8 kg./cm.$^2$, 15 ml./min.,
   Chart speed: 1 cm./min.
   Retention time: 140 min., which coincides with that of the authentic sample.

(3) Column [5% diethylene glycol succinate polyester (Gas-chrom Q 50–100)] (sold by Nishio Kogyo K.K.) 1.2 m., 2.2 mm. $\phi$:
   Column temperature: 140° C.
   Carrier gas: He, 1 kg./cm.$^2$, 15 ml./min.,
   Chart speed: 1 cm./min.
   Retention time: 4.2 min., which coincides with that of the authentic sample.

The present product was found to be pure gas-chromatographically by the coincidence of its retention time and magnitude of the peak with those of the authentic L-ascorbic acid.

Mass spectra by means of Hitachi Mass Spectrum (produced by Hitachi Seisakusho, Ltd., in Japan)
   Chamber voltage: 70 e.v.,
   Ion source temperature: 200° C., The parent peak of the sample was 176, which coincided with that of the authentic L-ascorbic acid recorded under the same conditions.

INFRARED ABSORPTION SPECTRA

The spectrum of the sample recorded using Nujol was identical with that of the authentic L-ascorbic acid.

Elemental analysis.—Calcd. for $C_6H_8O_6$ (percent): C, 40.91; H, 4.55. Found (percent): C, 40.96; H, 4.59.

Example 2

An aqueous solution containing $1 \times 10^{-2}$ mol/l. of L-sorbose was irradiated with $\gamma$-ray at room temperature (20° C.) while changing the molarity of the sodium hydroxide added. The relationships between the pH and G value are shown in Table 1. The concentration of L-ascorbic acid in the irradiated solution was determined by the UV absorption at 265 m$\mu$ after neutralization.

TABLE 1

Dose: $2.45 \times 10^{19}$ e.v./ml.

| pH: | G value |
|---|---|
| 9.45 | 0.2 |
| 10.20 | 0.5 |
| 10.90 | 1.6 |
| 11.90 | 1.8 |
| 12.70 | 1.7 |

In Table 1, the dose shows the total exposure dose of $\gamma$-ray. The G values were calculated by the following formula:

$$G = \frac{\text{The number of moles} \times \text{Avogadro number} \times 100}{\text{The absorbed dose (e.v.)}}$$

Example 3

Ferrous sulfate was added to a dilute aqueous sulfuric acid solution of L-sorbose, and the mixture was irradiated with $\gamma$-ray at 20° C. (the concentration of L-sorbose: $1 \times 10^{-2}$ mol/l; the concentration of ferrous sulfate: $1 \times 10^{-3}$ mol/l.; and the concentration of sulfuric acid: $1 \times 10^{-3}$ mol/l.). The results are shown in Table 2. The UV absorption at 245 m$\mu$ of the irradiated solution was measured then the absorption of ferrous ion substrated.

TABLE 2

$\gamma$-Ray dose (e.v./mol): $1.225 \times 10^{19}$
G value: 1.9

Example 4

A methanolic solution of L-sorbose ($1+10^{-3}$ mol/l.) was irradiated with $\gamma$-ray. The yield and G value of L-ascorbic acid in relation to dose are shown in Table 3.

TABLE 3

$\gamma$-Ray dose (e.v./ml.): $2.45 \times 10^{19}$
G value: 0.012

As can be seen from Tables 1–3 the G values ranged from a low of 0.012 (in Table 3) to a high of 1.9 (in Table 2).

Example 5

L-sorbose (450 mg.) was dissolved in 250 ml. of distilled water. This solution was saturated with nitrous oxide by bubbling it for 1 hour. The thus treated solution was irradiated with $\gamma$-ray of $8.84 \times 10^{19}$ e.v./ml. dose. Thereafter, 10 mg. of manganese dioxide was added to the solution under stirring. The solution was filtered off, and the pH of the filtrate was adjusted to be 5.00. The thus adjusted filtrate was saturated with hydrogen sulfide by bubbling it for 15 min. The aqueous solution saturated with hydrogen sulfide was allowed to stand for 5 hours at 3 to 5° C. The air in the solution was replaced by nitrogen, and the solution was freeze-dried. The thus freeze-dried residue was extracted with methanol, and the extract was concentrated under reduced pressure. The concentrate was dissolved in a small amount of metaphosphoric acid solution saturated with hydrogen sulfide. The thus obtained solution was charged on a silica gel thin layer chromatography. After drying, it was developed with methanol. The L-ascorbic acid portion was collected, and then extracted with methanol. The methanol of the extract was evaporated, and the residue was recrystallized from a mixture of methanol and ethanol. The yield was 3.4 mg.

Example 6

L-sorbose (18 g.) was dissolved in 100 ml. of water containing $1 \times 10^{-2}$ mole/l. of sodium hydroxide, and 0.5 g. of Raney nickel was further added. The mixture was saturated with nitrous oxide, and irradiated with γ-ray of $1.77 \times 10^{20}$ e.v./ml. dose. The thus irradiated solution was neutralized at pH 5.00 with a 2% metaphosphoric acid, and saturated with hydrogen sulfide. The thus treated solution was allowed to stand overnight in a refrigerator. The hydrogen sulfide in the solution was replaced by nitrogen under reduced pressure, and then the concentration of L-ascorbic acid was determined by the indophenol method. The concentration of L-ascorbic acid thus produced was 493 mg./l.

We claim:

1. A process for producing L-ascorbic acid which comprises irradiating a solution containing L-sorbose, L-tagatose or a mixture of L-sorbose and L-tagatose with gamma rays until L-ascorbic acid is formed.

2. A process according to claim 1 including the step of recovering the L-ascorbic acid.

3. A process according to claim 1 wherein the irradiating is continued until the amount of ascorbic acid reaches a G value of at least 0.012.

4. A process according to claim 3 wherein the irradiation is continued until the amount of ascorbic acid is within the range of G values from 0.012 to 1.9.

5. A process according to claim 1, wherein the solvent is water.

6. A process according to claim 1 wherein the concentration of the solution is from $1 \times 10^{-5}$ to $1 \times 10^{1}$ mol/l.

7. A process according to claim 1, wherein the air dissolved in the solution is displaced by an inert gas.

8. A process according to claim 1, wherein the pH of the solution is within the range of 8 to 13.

9. A process according to claim 1, wherein the gamma ray irradiation is effected in the presence of ferrous sulfate, alumina or zinc oxide.

10. A process according to claim 1, wherein the reaction temperature is 30° C. or less.

References Cited

UNITED STATES PATENTS 2,410,254   10/1946   Waddell et al. _____ 204—159

OTHER REFERENCES

Handbook of Chemistry and Physics, Chemical Rubber Co., 1950, pp. 1120–1121.

JOHN H. MACK, Primary Examiner

R. L. ANDREWS, Assistant Examiner

U.S. Cl. X.R.

204—158 R, 158 HE